(12) United States Patent
Ackley et al.

(10) Patent No.: US 9,843,744 B2
(45) Date of Patent: Dec. 12, 2017

(54) AUDIENCE INTERACTION PROJECTION SYSTEM

(71) Applicant: Disney Enterprises, Inc., Burbank, CA (US)

(72) Inventors: Jonathan Ackley, Glendale, CA (US); Lanny Smoot, Thousand Oaks, CA (US); Alfredo Ayala, West Covina, CA (US)

(73) Assignee: Disney Enterprises, Inc., Burbank, CA (US)

( * ) Notice: Subject to any disclaimer, the term of this patent is extended or adjusted under 35 U.S.C. 154(b) by 431 days.

(21) Appl. No.: 14/596,153

(22) Filed: Jan. 13, 2015

(65) Prior Publication Data

US 2016/0201888 A1    Jul. 14, 2016

(51) Int. Cl.
| | |
|---|---|
| *G03B 21/14* | (2006.01) |
| *H04N 5/33* | (2006.01) |
| *H04N 5/225* | (2006.01) |
| *G02B 27/14* | (2006.01) |
| *G02B 5/12* | (2006.01) |

(52) U.S. Cl.
CPC ............. *H04N 5/33* (2013.01); *G03B 21/14* (2013.01); *H04N 5/2256* (2013.01); *G02B 5/12* (2013.01); *G02B 27/141* (2013.01)

(58) Field of Classification Search
CPC .......... G03B 21/14; G02B 5/12; G02B 5/122; G02B 5/124; F21V 23/0457; F21V 23/0471; F21V 23/0478
See application file for complete search history.

(56) References Cited

U.S. PATENT DOCUMENTS

| | | | |
|---|---|---|---|
| 6,545,742 B2 * | 4/2003 | O'Hagan ............... | G03B 15/02 348/E5.022 |
| 6,796,656 B1 * | 9/2004 | Dadourian ............. | H04N 5/275 348/586 |
| 2002/0186221 A1 * | 12/2002 | Bell ....................... | G06F 3/011 345/474 |
| 2004/0183775 A1 * | 9/2004 | Bell ....................... | G06F 3/011 345/156 |
| 2011/0001935 A1 * | 1/2011 | Reale .................... | G03B 21/14 353/28 |
| 2015/0261497 A1 * | 9/2015 | Poulad ................. | G03B 21/145 353/28 |

* cited by examiner

*Primary Examiner* — William C Dowling
(74) *Attorney, Agent, or Firm* — Patent Ingenuity, P.C.; Samuel K. Simpson

(57) ABSTRACT

A process and system capture infrared light that is reflected or emitted from a device to precisely locate the device. The process and system project visible light from a light source toward the device such that the light is precisely targeted at the device. Preferably the visible light passes through an atmosphere containing particulate matter rendering the visible light as a beam that appears to emanate from the device rather than from the light source.

20 Claims, 7 Drawing Sheets

AUDIENCE INTERACTION PROJECTION SYSTEM

BACKGROUND

1. Field

This disclosure generally relates to the field of projection systems. More particularly, the disclosure relates to projections systems that interact with an audience.

2. General Background

Audiences typically watch entertainment such as theatrical performances, movies, lectures, concerts, sporting events and the like in a passive manner (i.e., as observers rather than participants). One contra-example used most often in sporting events and concerts is to give audience members props such as placards or lights that are used during some part of the performance to create an opportunity for audience interaction. However, these devices do not directly interact with the performance and performers occurring on stage or on the field. Hence, most audience members typically watch a performance with little or no participation in the performance.

The present disclosure relates to a particular technique for using light such as lasers, spotlights, projectors and the like to bridge the visual space between audience members and performers. These light sources are already used in theaters and stadiums, but are typically presented on stage, or within the theatre itself, but not in a manner that effectively engages individual audience members. Directing these types of lighting devices at specific individual audience members is difficult because locating audience members with engaging precision has been difficult as audiences change and audience members move around during the performance. Poorly targeted lighting effects aimed at the audience are not only ineffective, but may also pose safety concerns if powerful lighting is used. For example, audience members may view performers who are using laser beams during a performance, but lasers are not typically directed to or from individual audience members. Lighting devices given to audience members have limited range to inhibit, rather than encourage, audience interaction.

Therefore, an audience interaction projection system is needed to provide audience interaction with a lighting feature of an entertainment performance.

SUMMARY

A process and system capture invisible radiation that is reflected or emitted from an object to precisely locate the object. The process and system project visible light from a light source toward the object such that the light is precisely targeted at the object. Preferably, the visible light passes through an atmosphere containing particulate matter rendering the visible light as a beam that appears to emanate from the object rather than from the light source.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

An audience interaction projection system provides a lighting feature that provides a new way for an audience member to participate in an entertainment experience, e.g., theatrical performance, theme park feature, concert, sporting event, movie, etc. The audience member may actually feel as if they are launching powerful beams of laser-like light towards objects on the stage. The effect can be accomplished using either totally passive, and low cost materials (like a sheet retroreflector) given to audience members, or can be based on the color of audience apparel or objects they have, or can be done using active (powered) equipment, for instance a battery-powered emitter of visible or invisible light, that the guest brings with them, or is given before a show. In one implementation, the guest is provided with a retroreflective material in the form of a badge, amulet, handheld card, clothing, jewelry or other accessories, etc., that reflects light from the location of the retroreflective material (and thereby, for instance, the guest's hand). The retroreflective material can take various forms (e.g., fabric, paint, optical spheres, reflective corner cube arrays, or other available film or coating with retroreflective properties). The retroreflective material reflects invisible light such as IR light from the location of the object toward the source of the invisible light. The invisible light reflection is captured by an invisible light sensor such as an IR sensor or an IR image capture device located at the source of the invisible light to effectively and precisely identify the location of the retroreflective material and the audience member. A visible light beam having a visible light source co-located with the invisible light source and the invisible light sensor is then projected toward the location of the object which may provide an illusion of the retroreflective object emitting the visible light beam. The visible light beam may be gated or turned off during time periods when the invisible light sensor does not detect any returned invisible light thereby preventing visible light from being emitted towards anything other than the retroreflective objects when they are located thereby enhancing the perception that the visible light is being emitted from the retroreflective object.

The audience interaction projection system can be used with one or more audience members at the same time. When multiple retroreflective objects are identified, multiple light beams are projected toward each of the identified objects so that each of those intended audience members is provided with the illusion of projecting laser beams from their retroreflective materials. Further, audience members can view their own laser beams in addition to the laser beams of other audience members through the use of airborne particulate.

Figure 1A:
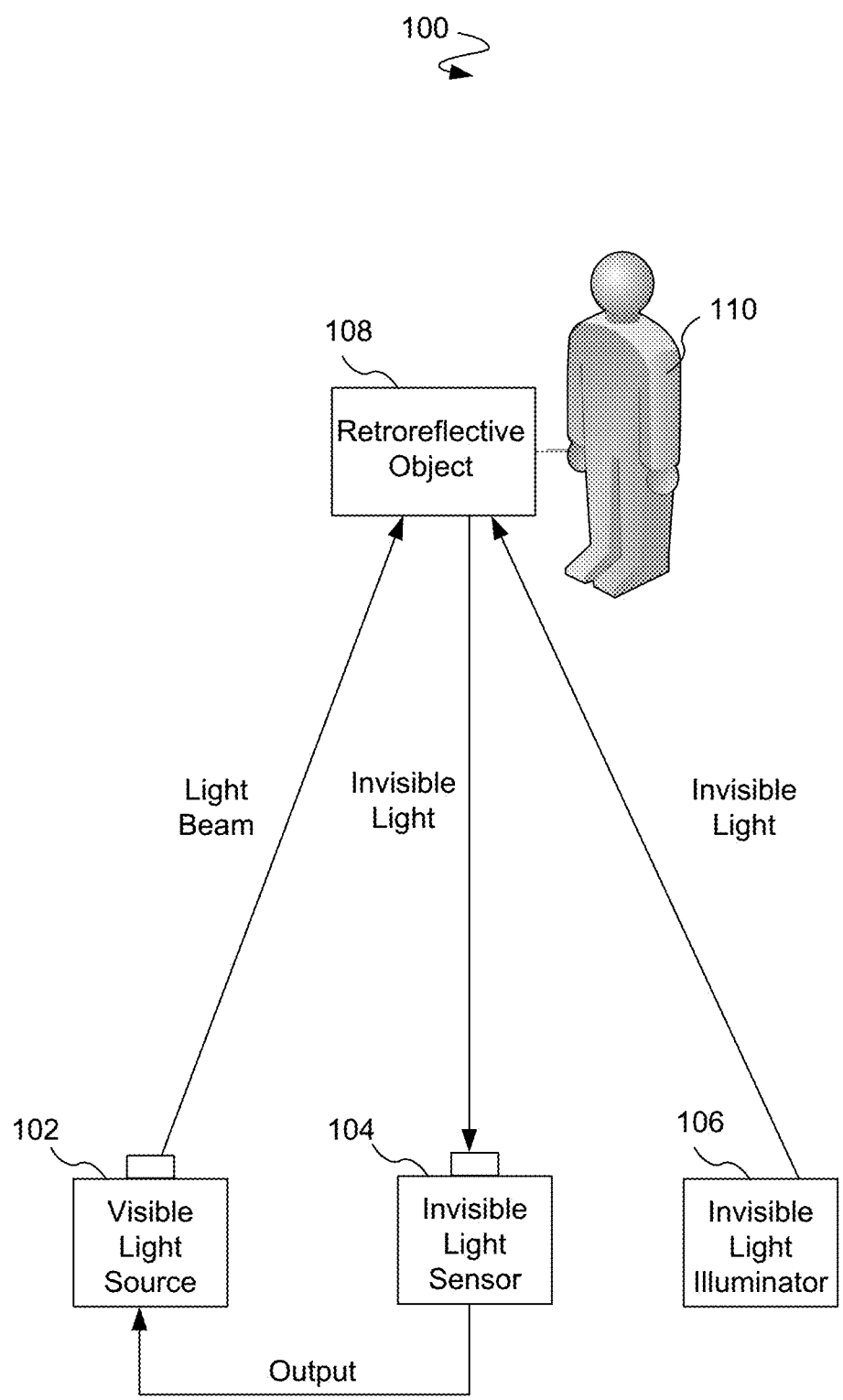
FIG. 1A illustrates an audience interaction projection system.

FIG. 1A illustrates an audience interaction projection system 100. The audience interaction projection system 100 has a visible light source 102, an invisible light sensor 104, and an invisible light illuminator 106. In one implementation, the visible light source 102, the invisible light sensor 104, and the invisible light illuminator 106 are boresighted based upon the same optical angle so that they all emit or capture light in a substantially similar field of view over a range of distance suitable for a particular entertainment environment. In another implementation, the visible light source 102, the invisible light sensor 104, and the invisible light illuminator 106 are positioned at particular angles and image rectification techniques are used so that they each emit or capture light from a scene as though they were substantially aligned to cover the same optical angle.

The visible light source 102, the invisible light sensor 104, e.g., an IR video camera (however any type of non-visible light may be advantageously used as in narrowband infrared, ultraviolet light, or even radio frequency emanations) or a non-imaging sensor, and the invisible light illuminator 106, e.g., LED illuminator, IR laser, filament, arc, or other invisible light source with sufficient power and directionality, are positioned in proximity to the entertainment performance. For example, in a theatrical environment the visible light source 102 may be positioned in an animatronic figure on the stage or in a prop of the set itself. The invisible light sensor 104 and the invisible light illuminator 106 may be positioned in the same area as the visible light source 102 or a different area that is in proximity to the entertainment performance such that the invisible light sensor 104 is in the return path of the reflected light or within a certain angle of the visible light source 102.

A retroreflective object 108 is worn or held by an audience member 110. The invisible light illuminator 106 emits IR light toward the retroreflective object 108, e.g., toward the field of view of the visible light source 102, the invisible light sensor 104, and the invisible light illuminator 106. Therefore, the invisible light may be directed toward a group of retroreflective objects 108 for multiple audience members 110 in the field of view of the visible light source 102, the invisible light sensor 104, and the invisible light illuminator 106.

The retroreflective object 108 can comprise a material that has retroreflective properties. The material can have a fine texture comprising a set of three orthogonal mirrors, a set of transparent spheres, or a plurality of beads that provide retroreflection.

The retroreflective object 108 reflects the invisible light toward the invisible light sensor 104. The invisible light sensor 104 captures an image in the field of view with a brighter patch at the location of the retroreflective object 108. The invisible light sensor 104 is operably connected to the visible light source 102 to send the output of the invisible light sensor 104 to the visible light source 102. In one implementation, a processor is used to send a control signal based on the output of the invisible light sensor 104 to the visible light source 102 to toggle the visible light source 102 on or off. In such a configuration, a data processor may provide special effects for the light beams emitted by the visible light source 102. The data processor, e.g., controller, logic device, etc., can change the colors of the emitted beams, (for all, or some users) and the size, or shape of the projected beam (e.g. enlarging it to make it more visible in particulate matter). The data processor can also flash the returned beams to provide a "strobing" effect in the projected beams. In addition, if the visible light source 102 and the invisible light illuminator 106 are not boresighted the data processor can perform a rectification of the viewpoints of the camera and projector such that there is a one to one correspondence between lit objects in the invisible light sensor's view, and objects illuminated by the visible light source 102.

In another implementation, the output of the invisible light sensor 104 is sent directly to the visible light source 102 without use of a processor. Therefore, the invisible light sensor 104 sends an image of the area in the field of view with a bright patch designating the location of the retroreflective object 108 to the visible light source 102. As the visible light source 102 and the invisible light sensor 104 are boresighted or positioned to have the same optical angle, the visible light source 102 projects a spot of light toward the location in the field of view where the bright patch received from the image capture device 102 was received such that the spot of light hits the retroreflective object 108.

In particular implementations, the span or volume between the visible light source 102 and the retroreflective object 108 is slightly hazed with particulate matter, e.g., water vapor, condensed water, liquid nitrogen, dust, theatrical fog, etc., so that the beam of light projected from the visible light source 102 to the retroreflective object 108 is visible. As the audience member 110 is unable to tell whether the beam of light is being emitted or received by the retroreflective object 108, the audience member 110 may perceive that the retroreflective object 108 is emitting the beam of light. As an example, the audience member 110 may be asked during the entertainment performance to raise an amulet with the retroreflective object 108 in the air after an appearance by an animatronic figure. After reflection and image capture are performed by the invisible light illuminator 106 and the invisible light sensor 104 respectively, the visible light source 102 positioned in the animatronic figure projects a light beam that is visible in particulate matter toward the amulet. The audience member 110 is provided with the illusion of the amulet sending a laser beam toward the animatronic figure even though the visible light source 102 in the animatronic figure is really sending the laser beam toward the amulet. The audience interaction projection system 100 may be controlled so as to count the number of returned spots and when a sufficient number have been registered, the animatronic figure could, for instance be destroyed using a special effect. The audience member 110 thinks that the animatronic figure was destroyed as a result of their own, or the combined effect of a number of audience members, sending a laser beam or beams toward the animatronic figure. Therefore, the audience member 110 is provided with the appearance of audience participation with a lighting feature during the entertainment performance.

The audience interaction projection system 100 can also be used to project visible light based on identification of a particular color of the object 108 and projecting the visible light toward the object 108 based upon identification of that color. For example, an audience member 110 can have a red index card. Light sensor 104 (now configured to detect red light only) detects light reflected from the index card having the particular color red and provides an output to the visible light source 102 that instructs the visible light source 102 to project the visible light towards the red object 108. If the index card was a different color that was not part of a reflection criterion, the invisible light sensor 104 would not send the output to the visible light source 102 to project visible light towards the retroreflective object 108.

Figure 1B:
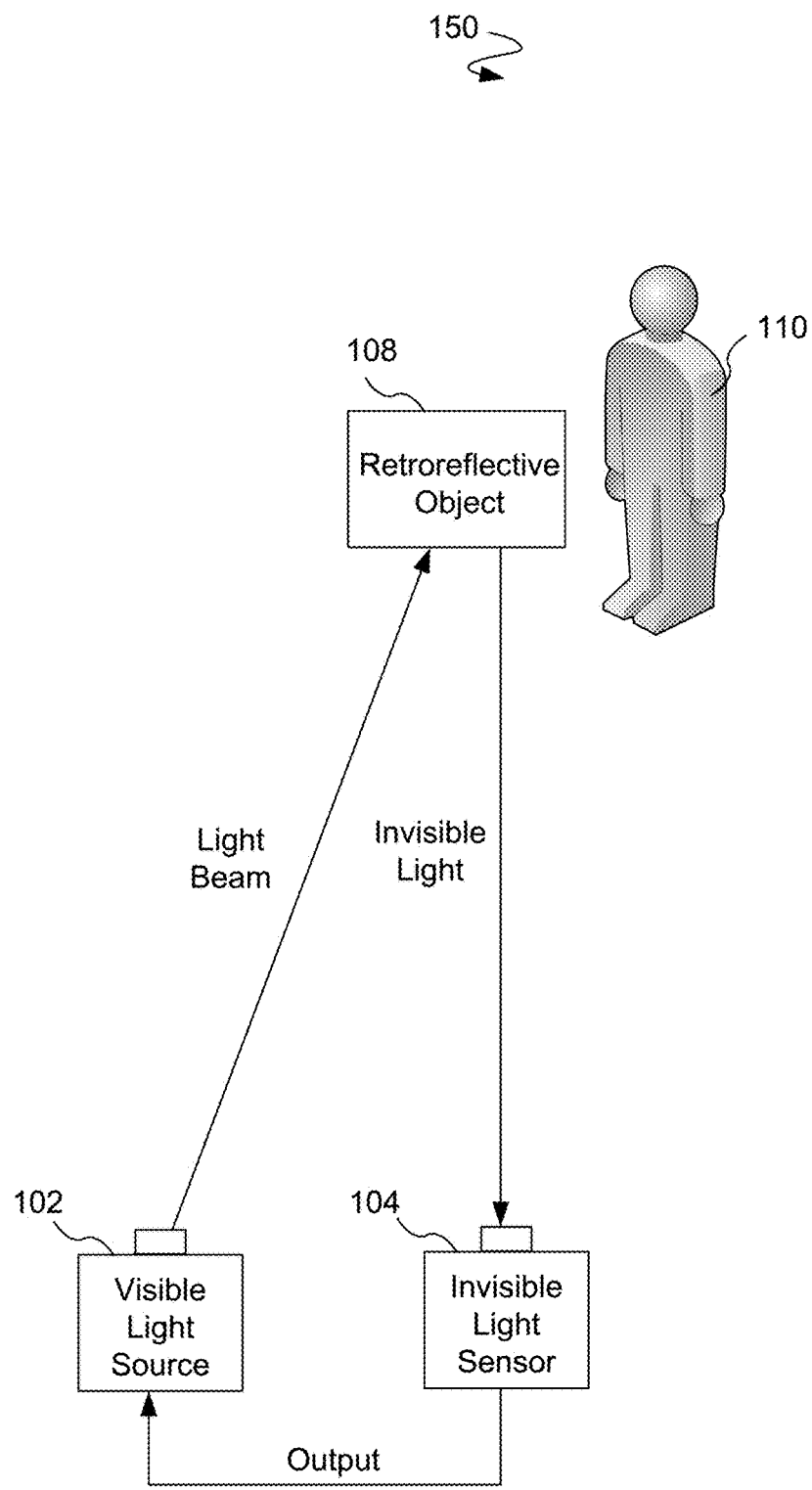
FIG. 1B illustrates an audience interaction projection system that operates retroreflection without receiving invisible light from the invisible light source illustrated in FIG. 1A.

FIG. 1B illustrates an audience interaction projection system 150 that operates without receiving invisible light from the invisible light source 106 illustrated in FIG. 1A.

The object 108 illustrated in FIG. 1B is a powered invisible light emitter, e.g., IR emitter, that emits invisible light toward the invisible light sensor 104.

Figure 2A:
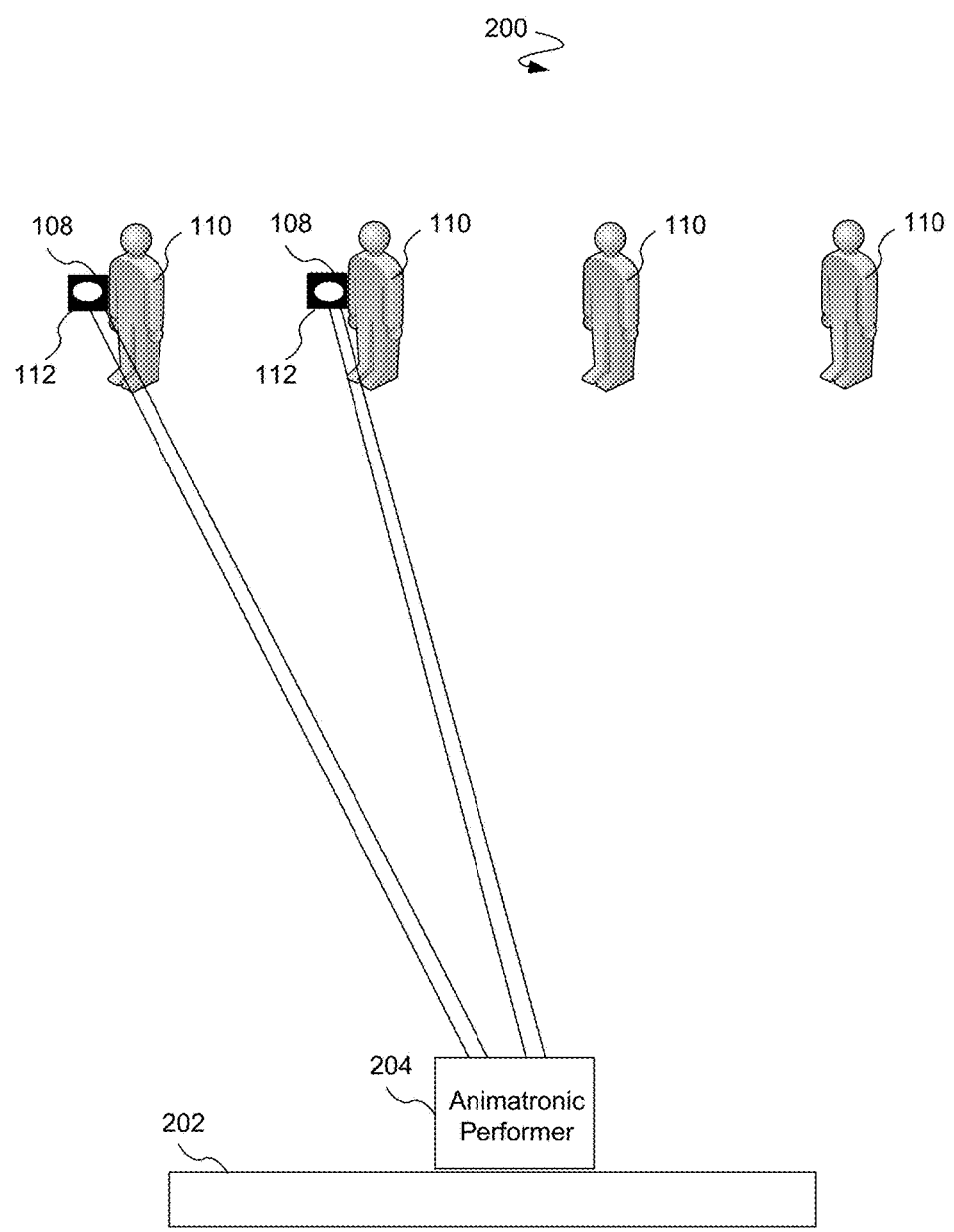
FIG. 2A illustrates an example of a theatrical performance configuration that uses the audience interaction projection system illustrated in FIG. 1.

FIG. 2A illustrates an example of a theatrical performance configuration 200 that uses the audience interaction projection system 100 illustrated in FIG. 1. The theatrical performance configuration has a stage 202 or other type of designated performance area on which an animatronic performer 204, e.g., an animatronic figure, provides a theatrical performance. A plurality of audience members 110 are positioned in proximity to the stage 202 to watch and possibly participate in the theatrical performance. For instance, audience members 110 that are positioned toward the left of the animatronic performer 204 from the perspective of the animatronic performer 204 are provided upon entry into the performance area with retroreflective objects 108, e.g., amulets whereas audience members that are positioned toward the right of the animatronic performer 204 from the perspective of the animatronic performer 204 are not provided with retroreflective objects 108. When the animatronic performer 204 arrives on the stage 202, multiple audience members 110 raise their amulets. The animatronic performer has a built in invisible light source 104 illustrated in FIG. 1 that receives an image capture in the field of view of the visible light source 102 of bright spots corresponding to the positions of the retroreflective objects 108. The visible light source 102 then emits a light beam through particulate matter toward each of the retroreflective objects 108. The audience members 110 then view multiple laser beams and are provided with the illusion that their retroreflective objects 108 are emitting laser beams toward the animatronic performer 204.

In various implementations, objects 112 held or worn by the audience members 110 emit light and are located by such light emissions rather than reflection of light from the invisible light illuminator 106. For instance, the audience members 110 have objects 112 such as badges with IR LEDs, mobile phones with a screen display of a bright image, etc. that emit light brighter than the light wavelength threshold for the room in which the theatrical performance is provided. The objects 112 may also emit light through visible light communication technology according to a coded pattern, e.g., flashing lights in a particular pattern. The invisible light sensor 104 captures an image over its field of view and detects objects 108 based upon the light wavelength, and/or the intensity threshold being exceeded and/or on the coded pattern being emitted. The visible light source 102 then emits light toward the objects to provide the illusion of the objects emitting a laser beam toward the animatronic performer 204.

Figure 2B:
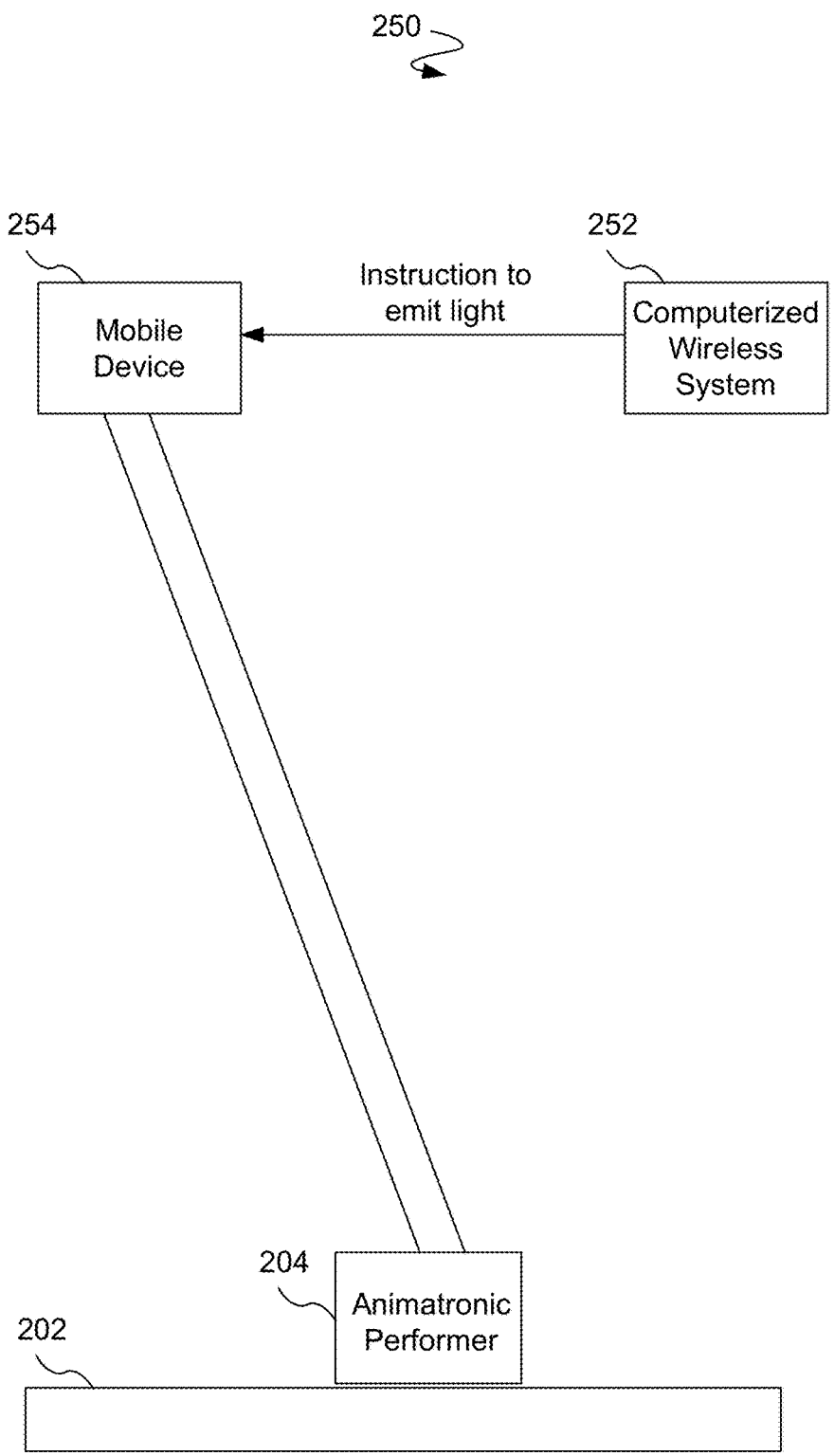
FIG. 2B illustrates a mobile communication configuration.

Further, the light emitted from the objects 108 can be manually activated by the audience members 110 or programmatically by a computerized wireless system. FIG. 2B illustrates a mobile communication configuration 250. The mobile communication configuration 250 comprises a computerized wireless system 252 that mobile device 254, e.g., a mobile phone, a tablet device, etc. For instance, the audience members 110 may be told during the entertainment performance by a human performer or a different animatronic performer that they can emit laser beams manually from their mobile phones 254 if they download an application prior to the animatronic performer 204 approaching the stage 202 and then activate that application when the animatronic performer 204 is on the stage 202. The application may emit light from the mobile phone 254 that exceeds the light wavelength/intensity threshold for the room in which the entertainment performance is provided or emit light according to a coded pattern. Other light emitters, e.g., candles, lighters, etc., may also be used by the audience members to emit light for image capture and then projection toward the light emitter. The light may also be emitted programmatically by the computerized wireless system 252 sending an instruction to the mobile phones 254 of the audience members 110 that activates the application to emit light. The computerized wireless system 252 may activate light emissions from selected mobile phones, badges, or other light emission devices. For instance, the computerized wireless system 252 can programmatically activate the applications of mobile phones for audience members 108 sitting in particular seats. A centralized processor can be used to in conjunction with applications on various networked mobile devices to enable or disable detection of particular mobile devices by the computerized wireless system 252. The colors of the laser beams can also be different for different audience members. Different shapes can also be drawn to generate various visual effects for the laser beams. Audio such as music, various "blast" sounds, etc., can also be produced in conjunction with the emission of light by the visible light source 102 and either played out over the handheld wireless devices, or through the venues audio system.

Figure 3:
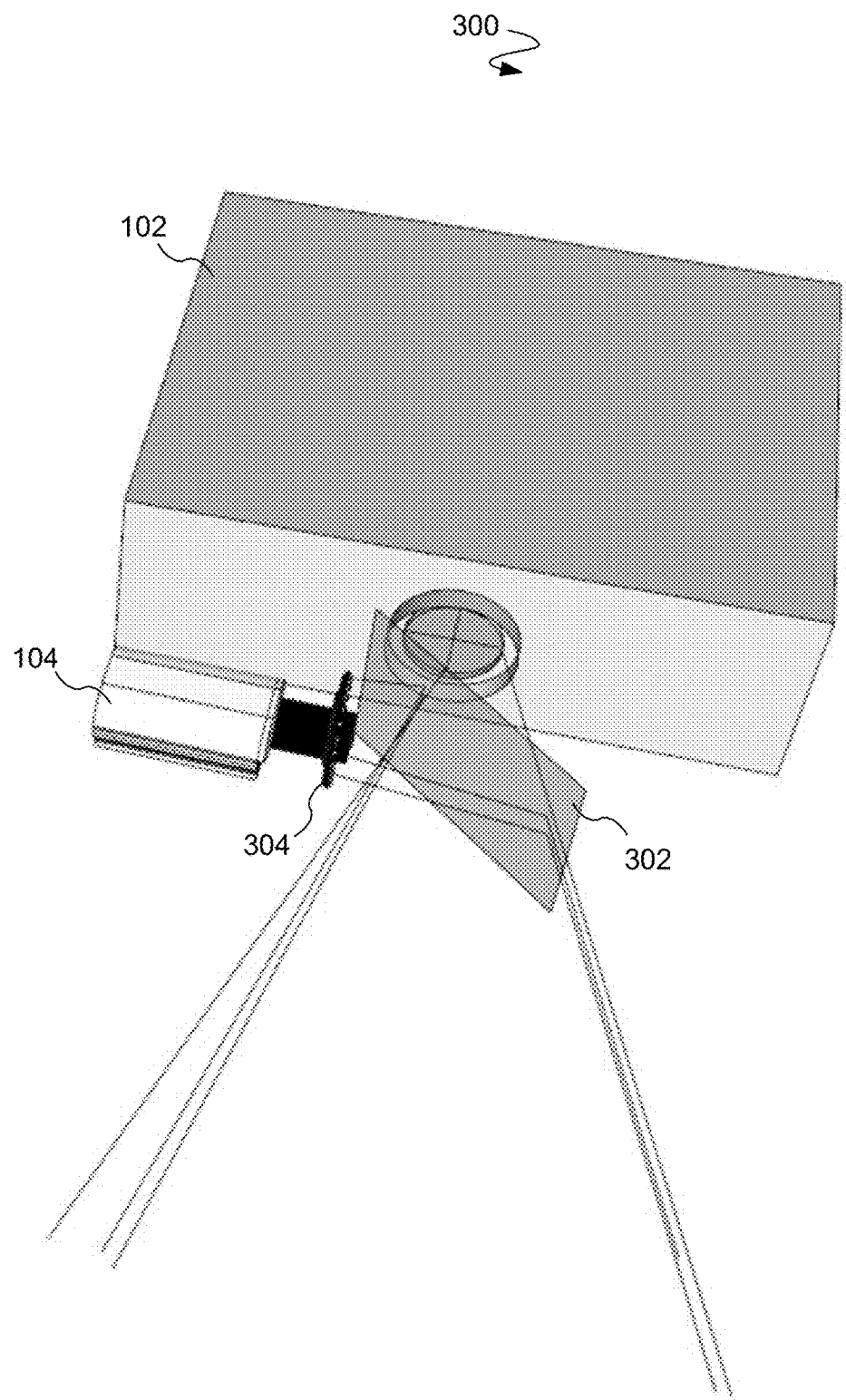
FIG. 3 illustrates a projection system configuration that uses a beam splitter.

FIG. 3 illustrates a preferred system configuration 300 that uses a beam splitter 302 for the audience interaction projection system configuration 100 illustrated in FIG. 1. The beam splitter (a "hot" mirror) 302 can both reflect IR light to be captured by the invisible image capture device 104, (here, an infrared video camera), and reflect outgoing light, (here provided by a ring of infrared LEDs 304), while allowing visible light from the visible light source 102 (here, a visible light video projector) to pass through. If the invisible light sensor 104 captures IR light reflected from many retroreflective objects 108, the beam splitter 302 can precisely align (boresight) the paths of the projected visible light from the visible light source 102 to each of the retroreflective objects 108. In other words, the beam splitter 302 optically aligns the invisible light detector's field of view with the visible light emitter's field of view.

Figure 4:
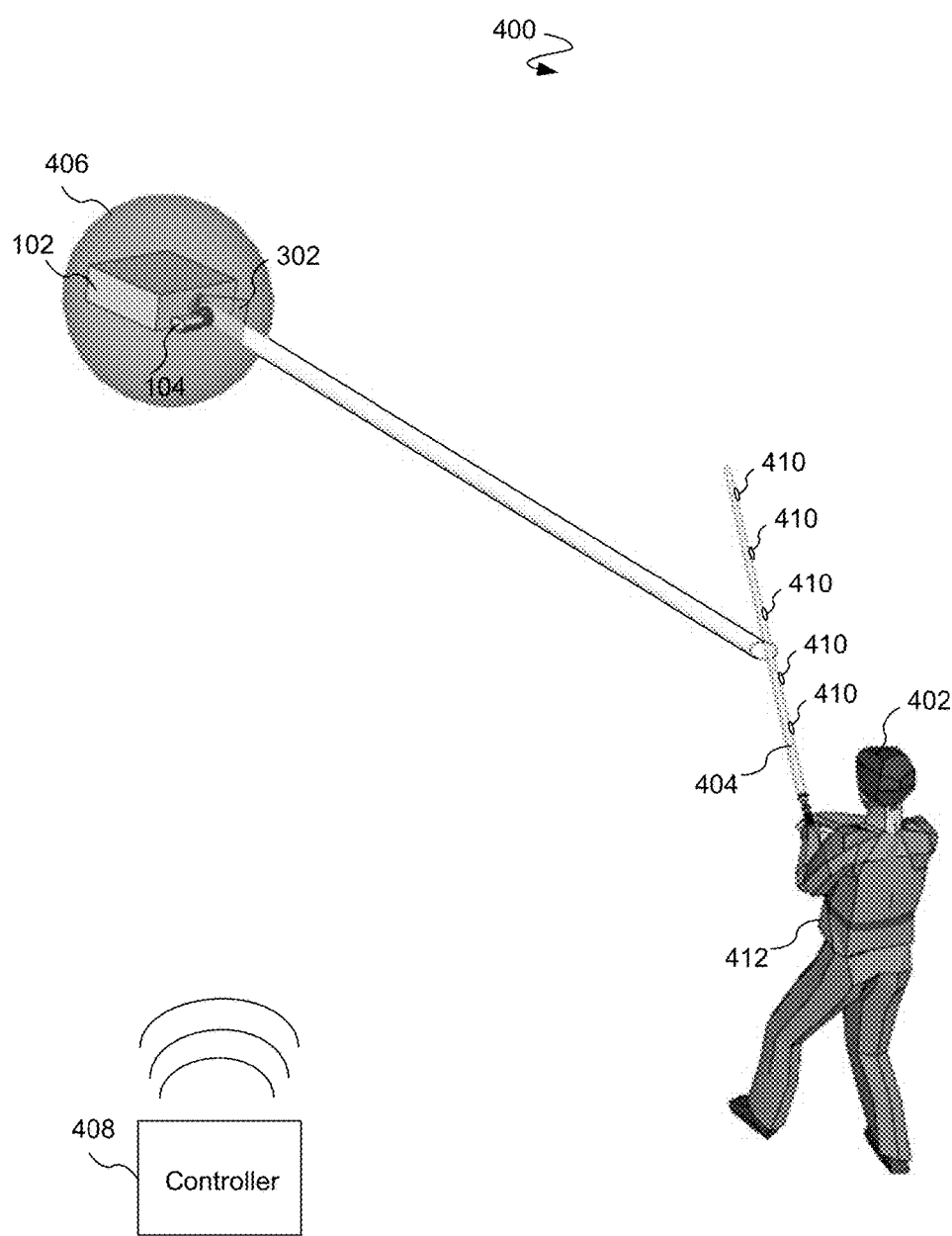
FIG. 4 illustrates an example in which the audience interaction projection system configuration is used to provide a user with an entertainment experience.

The audience interaction projection system configuration 100 can be used to provide a variety of entertainment experiences. FIG. 4 illustrates an example in which the audience interaction projection system configuration 100 is used to provide a user 402 with an entertainment experience. An entertainment environment 400 has a user 402 with a faux light saber 404 that interacts with a drone 406 flying through the air or operated with hidden rods to appear as if it is flying through the air. The faux light saber 404 has LEDs 410 attached thereto to provide IR light to the drone 406. As an LED is turned on, an invisible light sensor 104 built into the drone 406 captures an image of the field of view with a bright spot at the position of the activated LED 410. A visible light source 102 built into the drone 406 then projects light through particulate matter toward the faux light saber 404. As a result, the user 402 is provided with the illusion that the faux light saber 404 has deflected a laser beam. Multiple LEDs 410 can be activated in sequence at various times to give the user 402 the impression that the movement by the user 402 of the faux light saber 404 is deflecting multiple laser beams.

Other special effects such as haptic feedback (not shown) can be provided through use of transducers (not shown) positioned in proximity to the LEDs on the faux light saber 404. The transducer vibrates after an LED 410 is activated. Thus, the user 402 is provided with more of an impression that the laser beam was deflected by the faux light saber 404.

The user 402 can also be provided with the impression that the faux light saber 404 missed some of the laser beams and that the laser beams reached the user 402. The user 402 is provided with a haptic feedback vest 412 with a plurality of transducers that provide haptic feedback subsequent to the laser beam reaching the user 402 rather than the faux light saber 404.

A controller 408 is used to send wireless signals, e.g., IR, radio frequency ("RF"), etc., to the various LEDs 410 and transducers to activate the LEDs 410 and transducers. The controller 408 sends the wireless signals based upon a schedule, an algorithm, a script on controller 408, etc., or sends the wireless signals based upon manual operator input. A processor (not shown) built into the drone 406 instructs the visible light source 102 to project light that appears as a laser beam in particulate matter in the entertainment environment based upon detection of capture images, e.g., video frames, having bright spots denoting the LEDs 410 emitting IR light.

The entertainment environment 400 is not limited to use of the drone 406. Various other animatronic devices, mechanical devices, animated characters, virtual characters, etc. can be used. Further, the user 402 can use props other than the faux light saber 404 or a haptic feedback vest.

Figure 5:
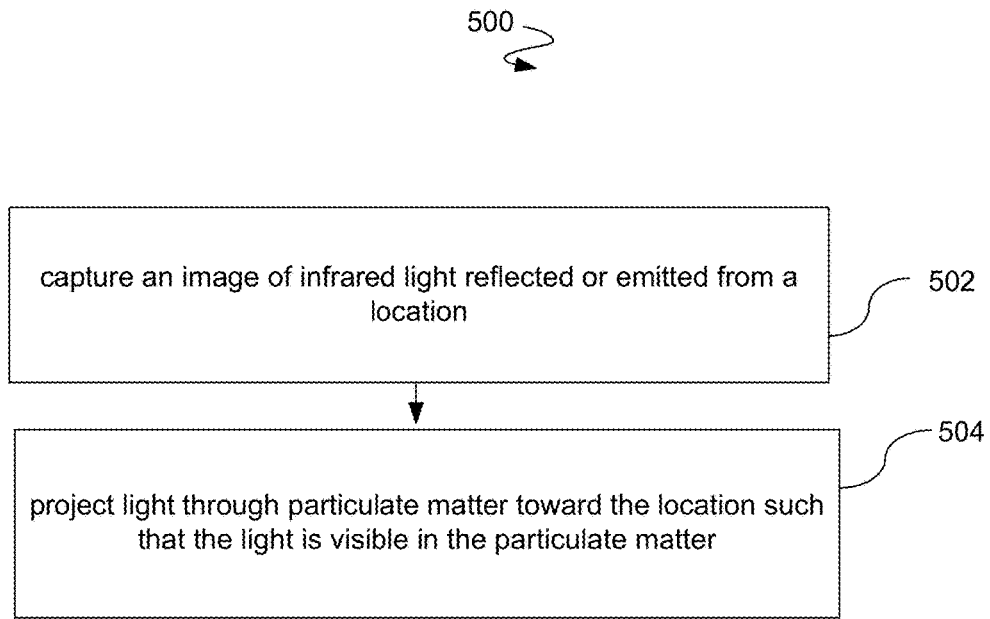
FIG. 5 illustrates a process that provides audience member or user interaction with an entertainment experience.

FIG. 5 illustrates a process 500 that provides audience member 110 or user interaction with an entertainment experience. At 502, the process 500 captures an image of infrared light reflected or emitted from a location. The image of the reflection or emission of the infrared light is used to determine the location of that reflection or emissions. At 504, the process 500 projects light through particulate matter toward the location such that the light is visible in the particulate matter. The particulate matter helps illuminate a beam of light that can be used as a laser beam in an entertainment performance.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:
    capturing an image of invisible radiation reflected from or emitted from a retroreflective object; and
    projecting visible light toward the retroreflective object such that the visible light appears to emanate from the retroreflective object.

2. The method of claim 1, further comprising emitting the invisible radiation from an invisible radiation illuminator prior to the image being captured.

3. The method of claim 1, further comprising aiming the visible light with a beam splitter that reflects the invisible radiation and allows the visible light to pass through in a direction of the reflected invisible radiation.

4. The method of claim 1, further comprising identifying a particular color of the retroreflective object and projecting the visible light toward the retroreflective object based upon identification of that color.

5. A system comprising:
    an image capture device that captures an image of invisible radiation reflected from or emitted from a retroreflective object; and
    a projector that projects visible light toward the retroreflective object such that the visible light appears to emanate from the retroreflective object.

6. The system of claim 5, further comprising an invisible radiation illuminator that emits the invisible radiation.

7. The system of claim 5, further comprising particulate matter through which the visible light is projected.

8. The system of claim 7, wherein the particulate matter is selected from the group consisting of: water vapor, condensed water, liquid nitrogen, dust, and theatrical fog.

9. The system of claim 5, further comprising a processor that instructs the projector to project the light based upon detection of a coded pattern in the image.

10. The system of claim 5, further comprising a processor that instructs the projector to project the light based upon detection of a wavelength of the infrared light exceeding a wavelength intensity threshold.

11. The system of claim 5, further comprising a beam splitter that reflects the invisible radiation and allows the visible light to pass through in a direction of the reflected invisible radiation.

12. An apparatus comprising:
    an invisible radiation emitter that is co-located with a retroreflective object;
    an image capture device that captures an image of invisible radiation emitted from the invisible radiation emitter; and
    a projector that projects visible light toward the retroreflective object such that the visible light appears to emanate from the retroreflective object.

13. The apparatus of claim 12, wherein the invisible radiation emitter is an infrared illuminator.

14. The apparatus of claim 12, further comprising particulate matter through which the visible light is projected.

15. The apparatus of claim 14, wherein the particulate matter is selected from the group consisting of: water vapor, condensed water, liquid nitrogen, dust, and theatrical fog.

16. The apparatus of claim 12, further comprising a processor that activates emission of the invisible radiation from the invisible radiation emitter.

17. The apparatus of claim 12, wherein the infrared emitter is a mobile device.

18. The apparatus of claim 17, further comprising a centralized processor that enables the mobile device to be detected or disabled from detection by the apparatus.

19. The apparatus of claim 17, wherein the mobile device emits one or more sounds that enhance the effect of the user launching a beam of light.

20. The apparatus of claim 12, further comprising a processor that activates a transducer to provide haptic feedback in proximity to the retroreflective object.

* * * * *